(12) United States Patent
Longmoore et al.

(10) Patent No.: US 6,497,965 B1
(45) Date of Patent: *Dec. 24, 2002

(54) SLIP AGENTS AND POLYPROPYLENE FILMS PREPARED THEREFROM

(75) Inventors: Kenneth J. Longmoore, Newark, DE (US); Edward K. Bullock, Landenberg, PA (US)

(73) Assignee: Applied Extrusion Technologies, Inc., New Castle, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,869

(22) Filed: Oct. 9, 1997

(51) Int. Cl.$^7$ ............................................. B32B 27/08
(52) U.S. Cl. ........................ 428/515; 428/516; 524/229
(58) Field of Search .................. 524/229; 428/515, 428/516

(56) References Cited

U.S. PATENT DOCUMENTS 5,100,930 A * 3/1992 Fukui et al. ............... 524/229
5,753,363 A * 5/1998 Bader et al. ............... 428/331
5,858,552 A * 1/1999 Bader et al. ............... 428/515
6,210,764 B1 * 4/2001 Hayes ....................... 428/34.9

FOREIGN PATENT DOCUMENTS

| EP | 0 249 342 | 12/1987 | ........... C08L/23/10 |
| EP | 0 677 554 | 10/1995 | ........... C08L/23/10 |
| EP | 0 826 491 | 3/1998 | ........... B32B/27/20 |

OTHER PUBLICATIONS

"Polyolefin Composition Having Antiblocking Properties"; Research Disclosure, No. 380, Dec. 1, 1995, p. 799 XP000549819, ISSN: 0374–4353.

* cited by examiner

Primary Examiner—Peter D. Mulcahy
(74) Attorney, Agent, or Firm—Caesar, Rivise, Bernstein, Cohen & Pokotilow, Ltd.

(57) ABSTRACT

Novel polypropylene films are prepared from a composition comprising polypropylene and an N,N-N,N'-bis-alkylene fatty amide having the general structural formula R—CO—NH—$(CH_2)_n$—NH—CO—R' wherein R and R' are the same or different alkyl or alkenyl groups having about 15 to 21 carbon atoms, n is an integer from 2 to 4 and —CO— is a carbonyl group. Such films are found to have improved utility for gravure printing applications.

16 Claims, No Drawings

SLIP AGENTS AND POLYPROPYLENE FILMS PREPARED THEREFROM

This invention relates to a novel polypropylene composition having specific utility in the manufacture of oriented polypropylene films and to polypropylene films prepared therewith. More specifically, it relates to polypropylene compositions containing certain fatty acid amides not heretofore known to be useful as components in polypropylene compositions.

BACKGROUND INFORMATION

In the manufacture of polypropylene films, it is common practice to include, in the polymer formulation, additives referred to as slip agents. These additives migrate to the surface of the film and decrease the coefficient of friction between the film and the metal rollers over which it is passed during processing, thus facilitating the processing of the film. They also decrease the coefficient of friction between layers of the film when it is wound into rolls thereby facilitating unwinding of the rolls for further processing.

The slip additives employed in most commercial polypropylene films are relatively high molecular weight fatty acid amides. The most widely used fatty acid amides are erucamide, an unsaturated 22 carbon amide (13-docosenamide) and behenamide (docosanamide), the saturated analogue of erucamide. Both of these compounds are readily available, naturally occurring materials. They are normally provided as mixtures containing a small amount of other amides containing about 18 to 20 carbons.

Erucamide works quite well as a slip agent, but it is not favored by some producers and converters as it is relatively volatile and extra care is required during film manufacture and conversion to avoid having quantities of the additive escape from the film and plate out on processing equipment, thereby causing a clean-up problem. For this reason, some producers prefer to use behenamide as the slip agent. As slip agents, erucamide and behenamide appear to perform substantially equally well but behenamide is less volatile and therefore films containing behenamide are easier to handle during processing since the behenamide does not escape and plate out on the processing equipment.

Despite the inconveniences encountered with erucamide-containing film, erucamide is the fatty acid amide slip agent of choice for those who wish to print the film using the well known rotogravure printing technique. In the rotogravure process, ink is applied to the print surface from a gravure cylinder containing the desired image as depressions on its surface. Ink is applied to the cylinder and the surface of the cylinder is wiped by a doctor blade to remove excess ink. The film to be printed is then contacted by the gravure cylinder and the image is thus transferred from the cylinder to the film. While the film is in contact with the cylinder, a small amount of erucamide is deposited on the raised portion of the cylinder. Since erucamide is soluble in the alcohol or ketone ink solvent, it is dissolved by the solvent in the next application of ink and is removed by the next swipe of the doctor blade. Thus, no build-up of erucamide occurs on the doctor blade or on the gravure cylinder.

Behenamide, on the other hand, lacking the carbon-carbon unsaturation found in erucamide, is substantially less soluble in the alcohols and ketones found in printing inks. Thus, when, in the course of rotogravure printing, some of the behenamide is deposited on the printing cylinder, it is not dissolved in the printing ink and wiped off when the next application of ink and wiping by the doctor blade takes place. As a result, the behenamide is merely wiped off by the next swipe of the doctor blade and substantially all of it remains on the blade. After multiple swipes of the blade, a behenamide build-up forms on the doctor blade and on the printing cylinder, eventually reaching a point at which the blade is prevented from wiping the surface of the printing cylinder clean. This build-up causes streaks to form on the printed film, requiring an interruption of the job in order to clean the doctor blade.

It will be immediately apparent that a slip additive that does not cause the film processing problems associated with erucamide but which allows the film to be rotogravure printed without causing the problems associated with behenamide would be a welcome contribution to the polypropylene film art. In accordance with this invention, there has been discovered a slip additive that accomplishes this objective.

It is an objective of this invention to provide oriented polypropylene films that exhibit improved properties in rotogravure printing as compared to films presently known to the art. It is likewise an objective of this invention to provide film-forming compositions for preparing such films.

BRIEF DESCRIPTION OF THE INVENTION

In accordance with this invention, it has been found that certain bis-fatty acid amides exhibit a combination of properties that makes them highly satisfactory as slip agents in oriented polypropylene films. In particular, this combination of properties make them highly satisfactory as slip agents in films that are to be printed in rotogravure printing operations.

Briefly stated, the invention is a composition comprised of a polymer or copolymer of propylene and an N,N'-bis-alkylene fatty acid amide having the general structural formula R—CO—NH—$(CH_2)_n$—NH—CO—R' wherein R and R' are the same or different alkyl or alkenyl groups having about 15 to 21 carbon atoms —CO— is a carbonyl group and n is an integer from 2 to 4 said N,N'-bis alkylene fatty acid amide being present in an amount from about 0.05 to about 0.5% by weight based on the combined weight of said amide and the polypropylene.

In another aspect, the invention contemplates an oriented film comprised of a polymer or copolymer of propylene and an N,N'-bis-alkylene fatty amide having the general structural formula R—CO—NH—$(CH_2)_n$—NH—CO—R' wherein R and R' are the same or different alkyl or alkenyl groups having about 15 to 21 carbon atoms, n is an integer from 2 to 4 and —CO— is a carbonyl group said N,N'-bis alkylene fatty acid amide being present in an amount from about 0.05 to about 0.5% by weight based on the combined weight of said amide and the polypropylene.

A preferred embodiment of the invention is a composite film comprised of a polypropylene core having, on at least one of its surfaces, a film layer comprised of a composition comprising polypropylene and up to about 0.5% of an N,N'-bis-alkylene fatty amide having the general structural formula R—CO—NH—$(CH_2)_n$—NH—CO—R' wherein R and R' are the same or different alkyl or alkenyl groups having about 15 to 21 carbon atoms, n is an integer from 2 to 4 and —CO— is a carbonyl group, said N,N'-bis alkylene fatty acid amide being present in an amount from about 0.05 to about 0.5% by weight based on the combined weight of said amide and the polypropylene.

DETAILED DESCRIPTION OF THE INVENTION

As used in the description of this invention and in the attached claims, the term "film" refers to a stand-alone film, i.e. a film of a sufficient thickness to have the strength and other characteristics required to have utility in packaging and other applications without having to be united with another film to support it. Stand-alone monolayer films are seldom seen in commerce. However, the compositions of the invention are suitable for use in such films.

Oriented polypropylene films of commerce are usually composite, i.e. multilayer, structures in which a core layer of a thickness sufficient to impart stand-alone properties to the overall structure carries one or more thin functional layers on its surface(s). The term "film" will also be used to refer to these thin functional layer films although they do not have sufficient thickness to stand alone.

Composite polypropylene films are typically comprised of a homopolypropylene core having one or more functional layers on its surfaces. Functional layers can act, e.g., as heat or cold seal layers, as receiving layers for printing or other decorative material or as barrier coating receiving layers. In these cases, it is not required that the polymer in the surface layer be the same as that employed in the core, although it may be the same polymer formulated differently to serve the functional role that it is to serve in the completed film. Frequently, the surface layer will be of a different polymer that has been found to perform the desired function more satisfactorily than would the polymer employed in the core.

When reference is made herein to polypropylene, it is intended to indicate a crystalline (isotactic) propylene homopolymer or a copolymer of propylene with ethylene or an α-olefin having 2 to 5 carbon atoms in an amount insufficient to have a significant effect on the crystallinity of the polypropylene. Typically, the comonomer will be ethylene in an amount of 6% or less.

Suitable polypropylenes are the commercially available isotactic polypropylenes having a melt flow rate between about 2 and about 10 dg/10 min at 230° C. and 2.16 Kg. load and a DSC melting point of about 160 to 166° C. One polypropylene that can be used is the isotactic homopolymer having a melt flow rate of about 3.5 dg/1 0 min at 230° C. and 2.16 Kg. load, available from Aristech Chemical Corporation, Pittsburgh, Pa. Suitable polypropylenes are also available from Montell, Inc. Wilmington, Del., Exxon Chemical Company, Baytown, Tex. and Fina Oil and Chemical Co., Deer Park, Tex.

Since different layers are formulated differently, it is possible that different slip agents may be used in the different layers or that some layers contain no slip agent. Thus, it is possible and desirable, in cases where problems are encountered when using conventional slip agents, e.g. in the rotogravure printing process as described above, to limit the use of the bis-amides of the invention to the functional layer where its presence yields the desired advantage. In such cases, where in the past the conventional slip agents have been added to the core layer and allowed or forced to migrate into the functional layers, it is found that the presence of the bis amides almost completely prevents the migration of the conventional slip agent, e.g. erucamide or behenamide from the core to the functional layer where it can cause a problem.

The slip additives employed in the compositions and oriented films according to this invention are N,N'-bis- fatty acid amides having the general structural formula R—CO—NH—$(CH_2)_n$—NH—CO—R' wherein R and R' are the same or different alkyl or alkenyl groups having about 15 to 21 carbon atoms, n an integer from 2 to 4 and —CO— is a carbonyl group. The compounds employed in the compositions of this invention are characterized by having a relatively low degree of volatility and a relatively high degree of solubility in alcohols, ketones and esters.

Compounds meeting the above definition and description include, by way of example, N,N'bis-ethylene stearamide, N,N'-bis ethylene oleamide, N,N'-bis ethylene behenamide, N,N'-bis ethylene erucamide, N,N'-bis propylene stearamide, N,N'bis butylene oleamide.

The N,N'-bis-alkylene fatty acid amide is present in the compositions of the invention in a concentration of about 0.05 to about 0.5% by weight based on the total weight of the composition. Preferably, the concentration of the slip additive is between about 0.05 and about 0.25% and most preferably between about 0.5 and about 0.2%.

The slip agents of the prior art such as erucamide or behenamide are sufficiently volatile that a measurable portion of them always migrates from the interior of the film and forms a layer of slip agent on the film's surface, whether the film is a composite or a monolayer. The amount present on the surface can be measured by a technique referred to as Attenuated Total Reflectance Infra-Red Spectroscopy (ATRIR). When the ATRIR spectrum of a film sample stored at room temperature is compared to that of a film stored for 16 hours at 55° C., an increase in the amount of a prior art slip agent is detected. (Such heat aging is commonly applied to simulate film aging conditions.) The amount of the slip agents of this invention that migrates to the surface of a film cannot be measured by ATRIR. Their presence on the film surface is demonstrated only by their efficacy as slip agents.

The presence of conventional slip agents on the surface of a film can also be detected by rinsing the film surface with a solvent and testing for the slip agent by High Pressure Liquid Chromatography. Similarly, no accumulation of the slip agent of the invention can measured on the film surface by this technique, whereas it is readily detected in the solvent employed to wash the surface of a prior art film.

In prior art practice, slip agent is frequently incorporated into the core layer of composite films, which are then heat treated to force it to migrate to the surface layers. In other cases, if the slip agent is present only in a surface layer, it tends to migrate into the core layer although, as a rule, it is not needed there. In either case, this migratory tendency results in slip agent being present in locations where it is not needed. Moreover, it also requires the use of greater quantities of slip agent than are needed in order to assure that sufficient quantities are present in the area where the real need exists.

It has been found that the slip agents of this invention exhibit a very low tendency to migrate between layers or even within a layer of the film. Thus, a slip agent incorporated in a surface layer does not migrate into the core layer, nor does it migrate and accumulate on the surface of a layer as do the slip agents of the prior art. When tested by the ATRIR test or the surface rinse procedure mentioned above no accumulation of the slip agent is detected on the surfaces. The low migratory character of these slip agents causes them to remain in the layer into which they are incorporated.

Despite the absence of measurable amounts of the slip agent on the film surface, the slip agents of the invention are substantially equal to those of the prior art in decreasing the coefficient of friction (COF) of the film surface. Thus, the COF measured on the surface of a prior art film containing erucamide as the slip agent is about 0.15 to 0.35. That measured on a prior art film containing behenamide is about 0.15 to 0.35. The COF measured on the surface of a film of this invention is generally between about 0.15 and about 0.45.

The low migratory character of the slip agents of the invention also leads to other favorable effects on film processing. For example, the problem of vaporization encountered with erucamide and to a lesser extent with behenamide is eliminated. Also, as will be apparent from the above, in the preparation of composite films, it is not always necessary to have a slip agent in the core layer. Since the slip agent of the invention will not migrate into the core layer, one can put only the amount actually needed to give the desired slip properties in the surface layer and it will not migrate into the core layer and reduce the level in the surface layer below that required to give the surface of the film the proper slip quality.

As indicated hereinabove, the compositions of the invention have particular utility in the manufacture of rotogravure printable oriented polypropylene film thanks to the unique combination of good alcohol, ketone and ester solubility and low volatility exhibited by the N,N'-bis-alkylene fatty acid amides. Due to their low degree of volatility, these compounds do not vaporize from the surface of the film during manufacturing and conversion. Due to their relatively high degree of solubility in the solvents that are normally employed as solvents for printing inks, whatever small amounts these compounds that might be on the film surface does not form a build-up on the doctor blade during rotogravure printing. Films prepared using these compositions thus combine the favorable properties of conventional films containing behenamide during the manufacture and conversion of the film with the favorable properties of those containing erucamide for use in rotogravure printing.

In yet another aspect, the slip agents employed in the films of the invention are found to be improved candidates for use as cold seal films. Cold seal films are prepared by treating the films with a cold sealable adhesive such as a rubber cement and many applications for printed films are applications in which cold seals are preferred over more conventional heat seals. In prior art usage, particularly when erucamide is employed as the slip agent, it is found that the high level of the slip agent on the film surface weakens or even, in extreme cases, destroys cold sealability. Using the slip agents of this invention at the levels specified, very little or no harmful effect on cold seal is seen.

In addition to the slip agents of this invention, conventional additives, in conventional amounts, can also be included in the films. Suitable conventional additives include, by way of example, antioxidants, pigments, orientation stress modifiers, flame retardants, antistatic agents, antiblocking agents, and antifoggants. Any such additives that do not interfere with the functioning of the slip agent can be present.

In any embodiment of the films of the invention, the film can be either clear and transparent or it can be opaque. Typically, polypropylene films are rendered opaque by loading the core layer with a void forming opacifier such as calcium carbonate. Such opacifiers cause opacity by forming microvoids in the polymer matrix during the drawing operation. Other types of opacifiers which cause opacity simply by increasing the optical density without voiding can also be employed. Typical of such an opacifier is titanium dioxide.

The total film thickness, for either the single or multiple layer films, is preferably in the range of about 0.25 to about 1.5 mil, i.e. about 25 to about 150 gauge. In the multilayer embodiment, the core layer preferably has a thickness of about 23 to about 40 gauge, while the other layers preferably each have a thickness of about 2 to about 10 gauge.

To prepare a printable surface, the surface of the film that is to be printed is subjected to an oxidation treatment to impart a degree of polarity to the surface, which ensures good adhesion of the printed information to the film. Suitable oxidation treatments include, by way of example, corona discharge, flame and acid etching. The preferred treatment is with corona discharge or with flame. The use of flame and corona, seriatim, is also known and frequently employed.

The oxidation treatment is preferably carried out to a degree sufficient to create a surface tension on the film surface equal to about 35 to about 60 dynes/cm. A preferred surface tension is about 35 to about 40 dynes/cm.

As stated hereinabove, composite films can have, in addition to the printable surface, other functional layers on the surface opposite the print layer. If the layer on the side opposite the print layer is a barrier coating receiving layer, that layer will also be subjected to an oxidation treatment to approximately the same degree as is applied to the print layer.

While the invention has been described with emphasis on its utility in rotogravure printing, it will be apparent that other types of films, including functional layers, can also benefit from the low volatility and the lower degree of migratory tendency of the slip agents of the invention. One type of such film is metallizable film where the greater migratory tendency and volatility of conventional slip agents tends to result in a greater amount of slip agent on the film surface, which can sometimes interfere with bonding of the metal coating to the film surface. The same effect is also noted with cold seal coatings applied to the film surface.

Polypropylene films according to the invention can be prepared using film forming and orientation methods and techniques well known to the plastic film art. Thus the films can be prepared using the tubular or bubble process wherein a tube of film is extruded through a circular die and is drawn and inflated simultaneously to effect biaxial orientation. Likewise, they can be prepared by the tenter process in which a flat sheet of the film is drawn from the die at a multiple of the lineal rate of extrusion to effect longitudinal orientation and is thereafter drawn laterally by a preselected multiple of its original width to effect lateral orientation. As a rule, films prepared by the bubble process are drawn uniformly 6× by 6× or 7× by 7×. When the tenter process is employed, the draw is usually carried out to 5× in the machine direction and 10× in the cross direction. These draw ratios are also suitable for the films of the invention, although other ratios can be employed if desired.

In the examples that follow, a series of biaxially drawn three layer composite films were prepared on a 2.5 meter tenter. The films were cast from a three layer die at 265° C. onto a chill roll maintained at 40° C. The cast films were drawn 4.8× in the machine direction at 120° C. and then 10.4× in the cross direction at 120° C. Finally, they were heat set at 160° C. to a relaxation of about 8%. All samples were then corona treated on a covered roll corona treater at 35° C. and 20 amps.

EXAMPLE 1

A three layer composite film comprised of a homopolymer core of 0.69 mil thickness containing 0.07% by weight behenamide, a 0.02 mil homopolymer layer on one surface containing 0.25% crosslinked methyl sesquioxide particles and, on the other surface, a 0.04 mil layer of a copolymer of polypropylene and 4.5% ethylene (Fina 8573 from Fina Oil and Chemical Co., Deer Park, Tex.). This latter layer, intended to serve as a print layer, contained 0.10% by weight of N,N'-ethylenebis oleamide.

EXAMPLE 2

Example 1 was repeated except that the concentration of N,N'ethylenebis oleamide was 0.05% by weight.

EXAMPLE 3

Example 1 was repeated except that the concentration of N,N'ethylenebis oleamide was 0.20%.

EXAMPLE 4

Example 1 was repeated except that the concentration of behenamide was to 0. 10%.

EXAMPLE 5

Example 1 was repeated except that the print layer contained no slip agent.

EXAMPLE 6

Example 4 was repeated except that the concentration of the N,N'ethylenebis as 0.05%.

EXAMPLE 7

Example 1 was repeated except that the concentration of the behenamide was 0.05%.

EXAMPLE 8

Example 7 was repeated except that the 0.4% copolymer layer contained no N,N ethylenebis oleamide.

The samples of Examples 1 to 8 were subjected to a number of physical tests with reported in the following table.

| | % Slip Agent | | COF[1] | | | |
|---|---|---|---|---|---|---|
| Example | Core | Skin | Static | Kinetic | % Gloss[2] | % Haze[3] |
| 1 | 0.07 | 0.10 | 0.34 | 0.22 | 89.9 | 1.3 |
| 2 | 0.07 | 0.05 | 0.36 | 0.16 | 91.8 | 1 |
| 3 | 0.07 | 0.2 | 0.35 | 0.16 | 90.8 | 1 |
| 4 | 0.1 | 0.10 | 0.38 | 0.16 | 89.8 | 1.3 |
| 5 | 0.10 | 0 | 0.35 | 0.18 | 91.3 | 1.1 |
| 6 | 0.10 | 0.05 | 0.36 | 0.16 | 91.8 | 1.0 |
| 7 | 0.05 | 0.10 | 0.27 | 0.18 | 93.0 | 0.5 |
| 8 | 0.05 | 0 | 0.4 | 0.17 | 93.0 | 0.8 |

[1]COF according to ASTM D1894
[2]Gloss according to ASTM D2457
[3]Haze according to ASTM D1003

Film samples from Examples 1 to 8 were evaluated for their printing quality on an 11 color Cerutti press (North American Cerutti Corporation, Pittsburgh, Pa.) Examples 1 to 6 were printed with Manders inks (Manders Premium, Inc., Niles, Ill.) thinned to a #22 Zahn cup with a 1:1 ethyl alcohol/n-propyl acetate solvent. Examples 7 and 8 were printed with Sun NULAM and Sun SUNPLI inks thinned with Sun SL-02 and SL-05 solvent systems. (Here again we should have more informative descriptions).

All samples were evaluated on commercial quality print jobs and evaluated against commercially accepted controls as standards. In both evaluations, Examples 5 and 8, which contained no N,N'-ethylenebis oleamide, exhibited unacceptable streaking and/or ghosting. The films of Examples 1,2,3,4,6 and 7 which contained the N,N'-ethylenebis oleamide, exhibited no streaking or ghosting.

Two aspects of the cold seal properties of the film samples were examined. In order for the film to be able to be unwound from a roll where the cold seal layer is in contact with the other surface of the film on which no such adhesive is present, it must release readily from that layer. Then, when a cold seal is formed by bringing two areas of the cold seal layer together, it must not separate without application of a significant pulling force. These two aspects are referred to as release strength, which must be low, and the cold seal strength, which must be high.

To test these two parameters, a typical commercially available adhesive, Findlay C1099 (Findlay Adhesives, Wawatosa, Wis.) was applied to the print layer of a specimen of the film using a #7 Meyer rod. The coated film was then dried at 93° C. for 30 seconds. The dried film was then covered with a release film and cut into six individual samples. These were placed in a blocking jig at 100 psi and blocked at 100 psi for 16 hours at 50° C.

To test cold seal release strength, the release film was pulled from the specimen in an Instron tensile tester and the force to required to remove the film was measured.

To test cold seal adhesion strength, a specimen was cut in two along its longitudinal axis and the two halves were brought together, coating to coating, and pressed together at 80 psi for ½ second. Within one minute following sealing, the two pieces of film were pulled apart on the Instron tensile tester. Triplicate measurements were made for each specimen.

The cold seal release strength and the cold seal adhesion are both found to be comparable to that of conventional commercial films prepared with behenamide and erucamide slip agents.

What is claimed is:

1. A composite film having opposed first and second outer surfaces, said film comprising a core layer of polypropylene and one or more functional layers, one of said one or more functional layers being a blocking layer comprising polypropylene and an amide consisting essentially of a substantially non-migratory N,N'-bis alkylene fatty acid amide having the general structural formula R—CO—NH—$(CH_2)_n$—NH—CO—R' wherein R and R' are the same or different alkyl or alkenyl groups having about 15 to 21 carbon atoms, —CO— is a carbonyl group and n is an integer from 2 to 4, said N,N'-bis alkylene fatty acid amide being present in an amount from about 0.05 to 0.25% by weight based on the combined weight of said amide and the polypropylene, said composite film having a migratory slip agent in a layer other than said blocking layer for migrating to only said first outer surface, said migratory slip agent being blocked from migrating to said second outer surface by said substantially non-migratory fatty acid amide.

2. A composite film according to claim 1 wherein the polypropylene component of the blocking layer is a copolymer of ethylene and propylene containing up to about 6% by weight of ethylene.

3. A composite film according to claim 2 wherein the N,N'-bis-alkylene fatty acid amide is N,N'-bis-ethylene oleamide.

4. The composite film of claim 1, wherein said second outer surface is a surface of said blocking layer.

5. The composite film of claim 4, wherein said second outer surface is a gravure printable surface.

6. The composite film of claim 5, wherein said second outer surface includes gravure printing thereon.

7. The composite film of claim 1, wherein said migratory slip agent is included in said core layer.

8. The composite film of claim 1, wherein said core layer has opposed sides, each side including one of said functional layers thereon, said functional layers each having an outer surface opposed to a surface adhered to the core layer and constituting one of said outer surfaces of said composite film.

9. The composite film of claim 8, wherein said migratory slip agent is included in said core layer.

10. The composite film of claim 1, including two functional layers, one of said functional layers being said blocking layer and another functional layer being opposed to said blocking layer, said migratory slip agent being present in an amount sufficient to migrate to the surface of said functional layer opposed to said blocking layer.

11. The composite film of claim 8, including two functional layers, one of said functional layers being said blocking layer and another functional layer being opposed to said blocking layer, said migratory slip agent being present in an amount sufficient to migrate to the surface of said functional layer opposed to said blocking layer.

12. The composite film of claim 1, wherein said migratory slip agent is behenamide.

13. The composite film of claim 8, wherein said migratory slip agent is behenamide.

14. The composite film of claim 1, wherein the substantially non-migratory N,N'-bis alkylene, fatty acid amide is present in an amount from about 0.0027 to 0.011% by weight, based on the weight of the composite film.

15. The composite film of claim 8, wherein the substantially non-migratory N,N'-bis alkylene, fatty acid amide is present in an amount from about 0.0027 to 0.011% by weight, based on the weight of the composite film.

16. The composite film of claim 8, wherein the polypropylene component of said blocking layer is a copolymer of ethylene and propylene containing up to about 6% by weight of ethylene.

* * * * *